United States Patent
Renucci et al.

(10) Patent No.: US 6,996,134 B1
(45) Date of Patent: Feb. 7, 2006

(54) SYSTEM AND METHOD FOR RELIABLY COMMUNICATING TELECOMMUNICATION INFORMATION

(75) Inventors: Peter J. Renucci, Austin, TX (US); Matthew A. Pendleton, Cedar Park, TX (US)

(73) Assignee: General Bandwidth Inc., Austin, TX (US)

( * ) Notice: Subject to any disclaimer, the term of this patent is extended or adjusted under 35 U.S.C. 154(b) by 860 days.

(21) Appl. No.: 09/906,914

(22) Filed: Jul. 16, 2001

Related U.S. Application Data

(60) Provisional application No. 60/289,421, filed on May 7, 2001.

(51) Int. Cl.
    *H04J 3/04* (2006.01)
(52) U.S. Cl. .................. 370/535; 370/422; 379/413
(58) Field of Classification Search ........... 370/535, 370/352–356, 337, 347, 389, 282, 422, 485, 370/493, 465, 480; 379/219, 242, 413
    See application file for complete search history.

(56) References Cited

U.S. PATENT DOCUMENTS

| 4,381,427 A | 4/1983 | Cheal et al. ............... 179/2 DP |
| 4,493,092 A | 1/1985 | Adams ........................ 375/36 |
| 4,504,942 A | 3/1985 | Aro et al. ...................... 370/58 |
| 4,507,793 A | 3/1985 | Adams ........................ 375/58 |
| 4,512,025 A | 4/1985 | Frankel et al. ................ 375/36 |
| 4,578,537 A | 3/1986 | Faggin et al. ............. 179/2 DP |
| 4,608,686 A | 8/1986 | Barsellotti .................. 370/69.1 |
| 4,627,046 A | 12/1986 | Bellamy ....................... 370/58 |
| 4,740,963 A | 4/1988 | Eckley ..................... 370/110.1 |
| 4,748,656 A | 5/1988 | Gibbs et al. .................. 379/93 |
| 4,853,949 A | 8/1989 | Schorr et al. .................. 379/2 |
| 4,881,226 A | 11/1989 | Lechner et al. .......... 370/110.1 |
| 4,903,292 A | 2/1990 | Dillon .......................... 379/93 |
| 5,033,062 A | 7/1991 | Morrow et al. ................ 375/7 |
| 5,034,948 A | 7/1991 | Mizutani et al. .............. 370/79 |
| 5,042,028 A | 8/1991 | Ogawa ...................... 370/58.2 |
| 5,127,003 A | 6/1992 | Doll, Jr. et al. .......... 370/110.1 |
| 5,134,611 A | 7/1992 | Steinka et al. ................ 370/79 |
| 5,142,568 A | 8/1992 | Ogata et al. ................ 379/100 |

(Continued)

FOREIGN PATENT DOCUMENTS

EP          1 189 422 A2      3/2002

(Continued)

OTHER PUBLICATIONS

M. Verhoeyen, "Delivering Voice Services Over DSL," XP-000976726, *Alcatel Telecommunications Review*, 4th Quarter 2000, 6 pages.

(Continued)

*Primary Examiner*—Ajit Patel
*Assistant Examiner*—Chirag Shah
(74) *Attorney, Agent, or Firm*—Baker Botts L.L.P.

(57) ABSTRACT

A method reliably communicates content for multiple subscriber lines via a single physical transmission medium between a telecommunication gateway and equipment at a customer location. In that method, content for two or more subscriber lines of the customer location is received and converted into packetized data for network communications and/or multiplexed to form an added-main-line (AML) signal that includes power. The packetized data or the AML signal is communicated between the customer location and the telecommunication gateway via the single physical transmission medium. External power can be used to extract the content for the two or more subscriber lines from the packetized data in a primary mode of operation, and the power from the AML signal can be used to extract the content for the two or more subscriber lines from the AML signal in a backup mode of operation.

23 Claims, 7 Drawing Sheets

U.S. PATENT DOCUMENTS

| | | | |
|---|---|---|---|
| 5,142,571 A | 8/1992 | Suzuki et al. | 379/279 |
| 5,151,923 A | 9/1992 | Fujiwara | 375/5 |
| 5,216,704 A | 6/1993 | Williams et al. | 379/93 |
| 5,220,560 A | 6/1993 | Ogasawara | 370/79 |
| 5,267,300 A | 11/1993 | Kao et al. | 379/93 |
| 5,305,312 A | 4/1994 | Fornek et al. | 370/62 |
| 5,317,627 A | 5/1994 | Richardson, Jr. et al. | 379/88 |
| 5,349,640 A | 9/1994 | Dunn et al. | 379/387 |
| 5,410,343 A | 4/1995 | Coddington et al. | 348/7 |
| 5,426,692 A | 6/1995 | Fujise | 379/93 |
| 5,448,635 A | 9/1995 | Biehl et al. | 379/399 |
| 5,459,788 A | 10/1995 | Kim | 379/93 |
| 5,473,675 A | 12/1995 | Chapman et al. | 379/93 |
| 5,479,447 A | 12/1995 | Chow et al. | 375/260 |
| 5,493,609 A | 2/1996 | Winseck, Jr. et al. | 379/96 |
| 5,499,241 A | 3/1996 | Thompson et al. | 370/73 |
| 5,535,198 A | 7/1996 | Baker et al. | 370/60 |
| 5,594,727 A | 1/1997 | Kolbenson et al. | 370/442 |
| 5,604,737 A | 2/1997 | Iwami et al. | 370/352 |
| 5,610,922 A | 3/1997 | Balatoni | 370/468 |
| 5,613,069 A | 3/1997 | Walker | 395/200.15 |
| 5,617,423 A | 4/1997 | Li et al. | 370/426 |
| 5,625,685 A | 4/1997 | Allegranza et al. | 379/399 |
| 5,638,363 A | 6/1997 | Gittins et al. | 370/358 |
| 5,661,785 A | 8/1997 | Carpenter et al. | 379/93.15 |
| 5,668,857 A | 9/1997 | McHale | 379/93.07 |
| 5,671,251 A | 9/1997 | Blackwell et al. | 375/222 |
| 5,673,290 A | 9/1997 | Cioffi | 375/260 |
| 5,675,575 A | 10/1997 | Wall, Jr. et al. | 370/326 |
| 5,719,870 A | 2/1998 | Baker et al. | 370/463 |
| 5,737,333 A | 4/1998 | Civanlar et al. | 370/352 |
| 5,768,351 A | 6/1998 | England | 379/93.37 |
| 5,771,236 A | 6/1998 | Sansom et al. | 370/458 |
| 5,781,547 A | 7/1998 | Wilson | 370/395 |
| 5,781,617 A | 7/1998 | McHale et al. | 379/93.14 |
| 5,787,088 A | 7/1998 | Dagdeviren et al. | 370/493 |
| 5,828,666 A | 10/1998 | Focsaneanu et al. | 370/389 |
| 5,838,682 A | 11/1998 | Dekelbaum et al. | 370/401 |
| 5,841,840 A | 11/1998 | Smith et al. | 379/93.01 |
| 5,848,150 A | 12/1998 | Bingel | 379/399 |
| 5,864,747 A | 1/1999 | Clark et al. | 455/3.2 |
| 5,878,120 A | 3/1999 | O'Mahony | 379/93.09 |
| 5,881,142 A | 3/1999 | Frankel et al. | 379/167 |
| 5,883,941 A | 3/1999 | Akers | 379/93.08 |
| 5,889,773 A | 3/1999 | Stevenson, III | 370/352 |
| 5,889,856 A | 3/1999 | O'Toole et al. | 379/399 |
| 5,896,377 A | 4/1999 | Boot et al. | 370/352 |
| 5,898,761 A | 4/1999 | McHale et al. | 379/93.01 |
| 5,901,205 A | 5/1999 | Smith et al. | 379/93.01 |
| 5,905,781 A | 5/1999 | McHale et al. | 379/93.14 |
| 5,917,814 A | 6/1999 | Balatoni | 370/352 |
| 5,936,952 A | 8/1999 | Lecomte | 370/352 |
| 5,940,479 A | 8/1999 | Guy et al. | 379/93.01 |
| 5,943,404 A | 8/1999 | Sansom et al. | 379/93.06 |
| 5,949,763 A | 9/1999 | Lund | 370/261 |
| 5,970,473 A | 10/1999 | Gerszberg et al. | 705/26 |
| 5,974,043 A | 10/1999 | Solomon | 370/352 |
| 5,978,390 A | 11/1999 | Balatoni | 370/540 |
| 5,999,565 A | 12/1999 | Locklear, Jr. et al. | 375/222 |
| 5,999,598 A | 12/1999 | Henrick et al. | 379/93.07 |
| 6,075,784 A | 6/2000 | Frankel et al. | 370/356 |
| 6,081,517 A | 6/2000 | Liu et al. | 370/352 |
| 6,084,873 A | 7/2000 | Russell et al. | 370/352 |
| 6,091,722 A | 7/2000 | Russell et al. | 370/352 |
| 6,118,780 A | 9/2000 | Dunn et al. | 370/355 |
| 6,125,117 A | 9/2000 | Martin et al. | 370/397 |
| 6,130,879 A | 10/2000 | Liu | 370/230 |
| 6,181,715 B1 | 1/2001 | Phillips et al. | 370/493 |
| 6,222,829 B1 | 4/2001 | Karlsson et al. | 370/329 |
| 6,259,708 B1 | 7/2001 | Cheng et al. | 370/493 |
| 6,266,395 B1 * | 7/2001 | Liu et al. | 379/27.01 |
| 6,813,343 B1 * | 11/2004 | Vitenberg | 379/93.05 |
| 2002/0003802 A1 * | 1/2002 | Kim | 370/401 |
| 2002/0018491 A1 * | 2/2002 | Balatoni | 370/485 |
| 2002/0073142 A1 * | 6/2002 | Moran | 709/203 |
| 2002/0122552 A1 * | 9/2002 | Liu | 379/399.01 |
| 2002/0131422 A1 * | 9/2002 | Chu et al. | 370/397 |
| 2004/0213404 A1 * | 10/2004 | Posthuma | 379/413 |

FOREIGN PATENT DOCUMENTS

| | | |
|---|---|---|
| GB | 2313979 A | 12/1997 |
| WO | WO 97/23078 | 6/1997 |
| WO | WO 97/37458 | 10/1997 |
| WO | 0 841 831 A2 | 5/1998 |
| WO | WO 99/49608 | 9/1999 |
| WO | WO 01/06720 A1 | 1/2001 |
| WO | WO 01/13593 A1 | 2/2001 |
| WO | WO 01/13618 A1 | 2/2001 |
| WO | WO 01/13622 A2 | 2/2001 |

OTHER PUBLICATIONS

PCT International Search Report in International Application No. PCT/US 02/13869, dated Oct. 28, 2002, 7 pages.

Gudapati, et al., "Local Telephone Service for Cable Subscribers Using Packet Switched Access," ISS. World Telecommunications Congress, pp. 325-329, Sep. 21, 1997.

L. VanHauwermeiren, et al., "Offering Video Services over Twisted Pair Cables to the Residential Subscriber by Means of an ATM Based ADSL Transmission System," ISS Symposium, vol. 1, 5 pages, Apr. 1995.

T.C. Kwok, "Residential Broadband Architecture Over ADSL and G. Lite (G.992.2): PPP Over ATM," XP-000830885, IEEE Commumication Magazine, 6 pages, May 1999.

Notification of Transmittal of the International Search Report or the Declaration, 7 pages, Oct. 19, 2000.

Notification of Transmittal of the International Search Report or the Declaration, 6 pages, May 5, 2001.

Notification of Transmittal of the International Search Report or the Declaration, 7 pages, Jun. 29, 2001.

* cited by examiner

SYSTEM AND METHOD FOR RELIABLY COMMUNICATING TELECOMMUNICATION INFORMATION

CROSS-REFERENCE TO RELATED APPLICATIONS

This application (a) claims priority from provisional U.S. Patent Application Ser. No. 60/289,421, filed on May 7, 2001 by Peter J. Renucci, et al., entitled "System and Method for Communicating Telecommunication Information Between Customer Premises Equipment and Network Equipment with Greater Reliability"; and (b) is a continuation-in-part of U.S. application Ser. No. 09/502,369, filed on Feb. 11, 2000, by Peter J. Renucci, et al., entitled "System and Method for Communicating Telecommunication Information Between Network Equipment and a Plurality of Local Loop Circuits," ("the 0138 application"). The 0138 application is hereby incorporated herein by reference.

TECHNICAL FIELD OF THE INVENTION

This invention relates generally to the field of telecommunications and, more particularly, to a system and method for reliably communicating telecommunication information.

BACKGROUND OF THE INVENTION

Digital subscriber line (DSL) technology was initially deployed to provide data-only service as a replacement for slower-speed, dial-up modems. Incumbent local exchange carriers (ILECs), competitive local exchange carriers (CLECs), and other telecommunication providers have begun to explore offering voice over DSL (VoDSL) service to deliver integrated voice and data services.

Pairgain and Added Main Line (AML) are the names of common systems used by the telephone industry to digitally add more subscriber lines to a single twisted copper pair that runs from the central office to the customer premises. These systems take digitized pulse-code modulated (PCM) data and transmit it across the twisted pair. The transmission systems use echo cancellation, time-division multiplexing (TDM), or frequency-division multiplexing (FDM) in order to transfer data in both directions using a single pair of wires.

Existing VoDSL networks may not provide the degree of reliability necessary to enable true integration of telephony and data services. A typical VoDSL network requires two basic components: (1) a gateway that links the traditional telecommunication network to the DSL network and (2) an integrated access device (IAD), residing at a customer premises, that multiplexes and processes voice and data traffic between the gateway and multiple subscriber lines. If the IAD loses power or if the gateway, IAD, or other network equipment fails, the VoDSL service is terminated. Because of these architectural limitations, existing VoDSL networks do not provide the reliability of traditional telephone systems, and as a result, telecommunication providers remain wary of adopting VoDSL service.

SUMMARY OF THE INVENTION

In accordance with the present invention, a system and a method for communicating content for multiple subscriber lines via a single physical transmission medium are provided that substantially eliminates or reduces disadvantages or problems associated with previously developed systems and methods. According to that method, content for two or more subscriber lines of a customer location are received and converted into packetized data for network communications and/or multiplexed to form an added-main-line (AML) signal that includes power. The packetized data or the AML signal is communicated between the customer location and a telecommunication gateway via the single physical transmission medium. External power can be used to extract the content for the two or more subscriber lines from the packetized data in a primary mode of operation, and the power from the AML signal can be used to extract the content for the two or more subscriber lines from the AML signal in a backup mode of operation. The method thus provides lifeline service for multiple subscriber lines of a customer location.

Technical advantages of the present invention include a system for reliably communicating telecommunication information between a telecommunication network and a customer location. The system may communicate telecommunication information with customer premises equipment using either data packets or AML signals. The system may offer VoDSL service in a normal mode of operation by communicating telecommunication content over a local loop using data packets. If the data packet services fails due to a power loss at the customer premises, equipment failure, or any other cause, the system may provide emergency or lifeline service using multiple line-powered, analog telephone signals. The lifeline service may be provided for multiple lines at a customer location via a single physical transmission medium, such as a single local loop. The following description, figures, and claims further describe the present invention including its features, functions, and technical advantages.

BRIEF DESCRIPTION OF THE DRAWINGS

A more complete understanding of the invention and its objectives and advantages may be acquired by referring to the following description and the accompanying drawings, wherein.

DETAILED DESCRIPTION

Figure 1:
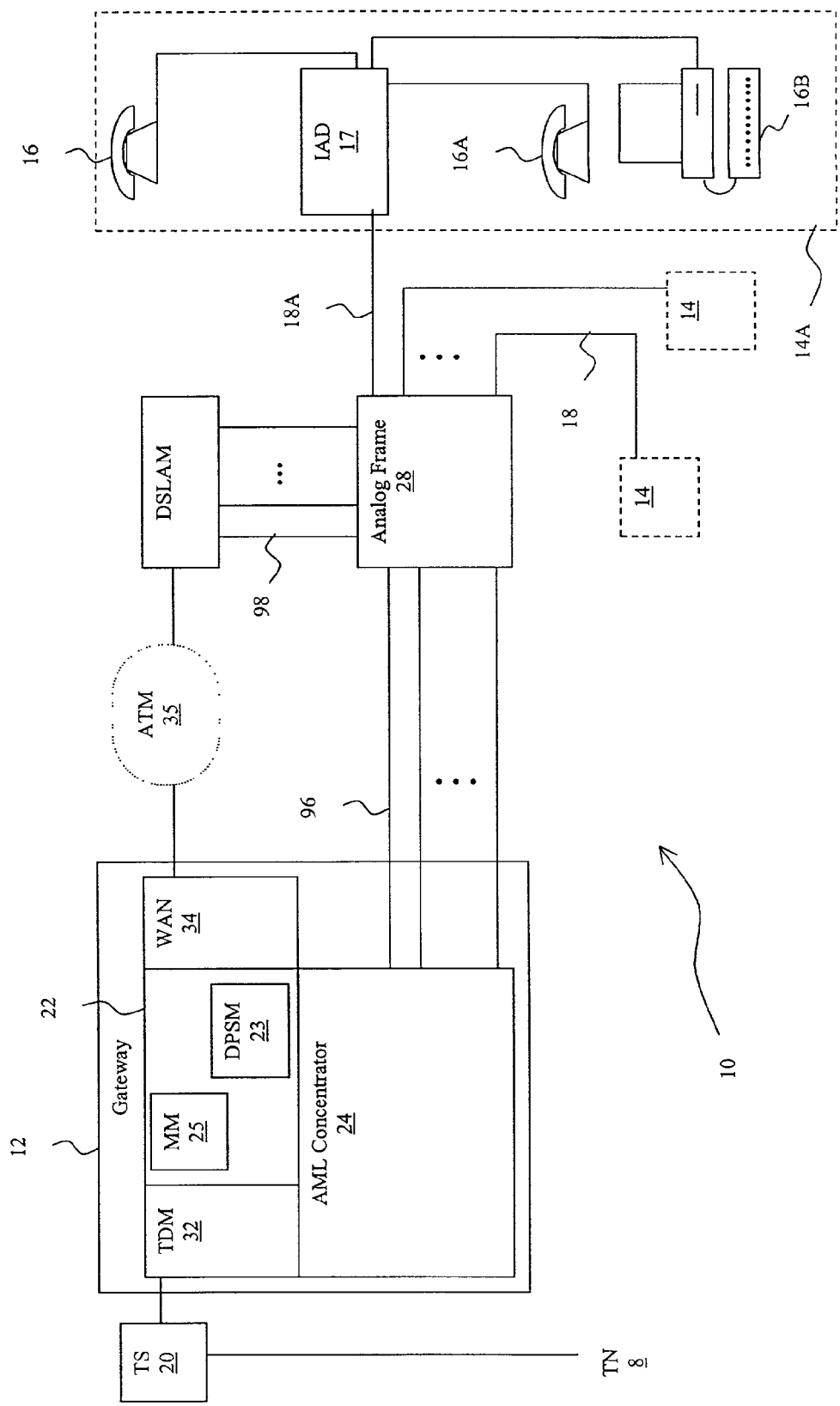
FIG. 1 presents a block diagram of a first example system for reliably communicating content for multiple subscriber lines of a customer location via a single physical transmission medium.

FIG. 1 depicts an example embodiment of a system 10 for reliably communicating content for multiple subscriber lines of a customer location via a single physical transmission medium. The provision of multiple subscriber lines via a single physical transmission medium is referred to herein as AML service. In the illustrated embodiment, three customer locations 14 are depicted, and system 10 provides AML service for each of those locations via a respective local loop 18. Specifically, system 10 communicates telecommunication information between a telecommunication network 8 and customer premises equipment 16 at customer locations 14. Telecommunication network 8 may be a public switched telephone network (PSTN), a private switched telephone network, or any other interconnected collection of telecommunication switches that provide local, long distance, or international telephone service. Telecommunication information includes voice, data, image, video, or any other type of information that may be communicated over a telecommunication network.

System 10 includes a telecommunication gateway 12, which may be located in one or more buildings, closets, or other locations. In a particular embodiment, the components of gateway 12 are contained within a chassis located in a central office, remote terminal, or other telecommunication site.

Gateway 12 sends and receives telecommunication information to and from telecommunication network 8 via a telecommunication switch 20. Telecommunication switch 20 may be a class 4 switch, a class 5 switch, or any other suitable switch for communicating telecommunication information between telecommunication network 8 and gateway 12. Telecommunication switch 20 and gateway 12 may communicate telecommunication information using GR-303, TR-8, signal system 7 (SS7), V5, integrated services digital network (ISDN), unbundled analog lines, or any other suitable interface.

One local loop 18 carries telecommunication information between gateway 12 and customer premises equipment 16 at each customer location 14. Local loops may also be called local-loop circuits. In the illustrated embodiment, each local loop 18 is a twisted-pair copper wire phone line, and each local loop 18 is used to communicate multiple subscriber lines. Each subscriber line provides a distinct channel for carrying information to and from the customer location at which that line terminates. For example, if a phone 16A is connected to a first subscriber line and a personal computer 16B is connected to a second subscriber line, phone 16A and personal computer 16B each have independent channels of communication which may be used simultaneously without either interfering with the other. A subscriber line may also be referred to as a telecommunication line or a logical telecommunication line. In alternative implementations, the system provides AML service for some customer locations but not others.

In the illustrated embodiment, system 10 provides a normal mode and a backup mode of operation for each customer location 14. For example, in the normal mode, system 10 provides customer location 14A with VoDSL service, with an IAD 17 and gateway 12 using data packets to send and receive telecommunication information for multiple subscriber lines over local loop 18A. However, if system 10 becomes incapable of supporting VoDSL service for the customer location due to a power loss at customer location 14A, gateway equipment failure, data network failure, or any other cause, system 10 provides emergency or lifeline service in the backup mode of operation. Moreover, as described in greater detail below, the lifeline service includes AML service.

The gateway 12 depicted in FIG. 1 includes a processing core 22, a telecommunication interface such as a TDM interface 32, a network interface such as a wide area network (WAN) interface 34, and an AML concentrator 24. In the example embodiment, those components represent functional elements that are reasonably self-contained so that each can be designed, constructed, and updated substantially independent of the others. In a particular embodiment, TDM interface 32, processing core 22, and WAN interface 32 are each implemented on one or more separate printed circuit boards that may be coupled to a backplane in a chassis. TDM interface 32 may be the same as or similar to the telecommunication interface depicted in FIG. 1 of the 0138 application.

In the normal mode, gateway 12 uses data packets to communicate telecommunication information with customer premises equipment 16. Gateway 12 may send and receive packets using Internet Protocol (IP), X.25, Frame Relay, Asynchronous Transfer Mode (ATM), or any other suitable data network protocol. In the illustrated embodiment, processing core 22 sends and receives telecommunication information to and from telecommunication network 8 via TDM interface 32 and sends and receives corresponding data packets to and from a data network via WAN interface 34. Specifically, processing core packetizes the telecommunication information received from telecommunication switch 20 for transmission to a data network, such as ATM network 35. Processing core 22 also extracts telecommunication information from data packets received from ATM network 35 and forwards the extracted content to telecommunication network 8. In the illustrated embodiment, processing core 22 includes a data packet service module 23, such as the one described in the 0138 application, and data packet service module 23 packetizes and extracts the telecommunication information.

System 10 also includes a digital subscriber line access multiplexer (DSLAM) 26. In the normal mode, DSLAM 26 communicates data packets between ATM network 35 and IAD 17 using DSL technology. DSLAM 26 receives data packets from ATM network 35, processes the data packets to generate digital DSL data, and communicates the digital DSL data over local loop 18A to IAD 17. DSLAM 26 also receives digital DSL data from local loop 18A, identifies data packets generated by IAD 30, and communicates the data packets to ATM network 35. Asymmetric DSL (ADSL), integrated DSL (IDSL), symmetric DSL (SDSL), high-data rate DSL (HDSL), rate-adaptive DSL (RADSL), very-high data rate DSL (VDSL), DSL-LITE, or other forms of DSL technology allow data transmissions over local loop 18A at greater speeds than offered by traditional dial-up modems. As a result, system 10 uses DSL technology to support broadband-based, telecommunication services over local loop 18A.

In the backup mode, gateway 12 uses modulated signals, instead of data packets, to communicate telecommunication information with customer premises equipment 16. The telecommunication information is converted into modulated signals for transmission to IAD 17, and extracted from modulated signals for transmission to telecommunication network 8, in AML concentrator 24. In the example embodiment, gateway 12 routes telecommunication information between TDM interface 32 and AML concentrator 24 according to control information received from a management module 25 in processing core 22.

In the example embodiment, AML concentrator 24 merges two or more calls from TDM time slots to create a single modulated signal. AML concentrator 24 also injects power into the modulated signal, thereby generating what is knows as an AML signal. The AML signal is transmitted to IAD 17 via local loop 18A. In addition, AML concentrator 24 extracts telecommunication information from different subscribers lines in an AML signal received from IAD 17, converts the content to TDM signals, and transmits the TDM signals to telecommunication network 8.

Figure 2:
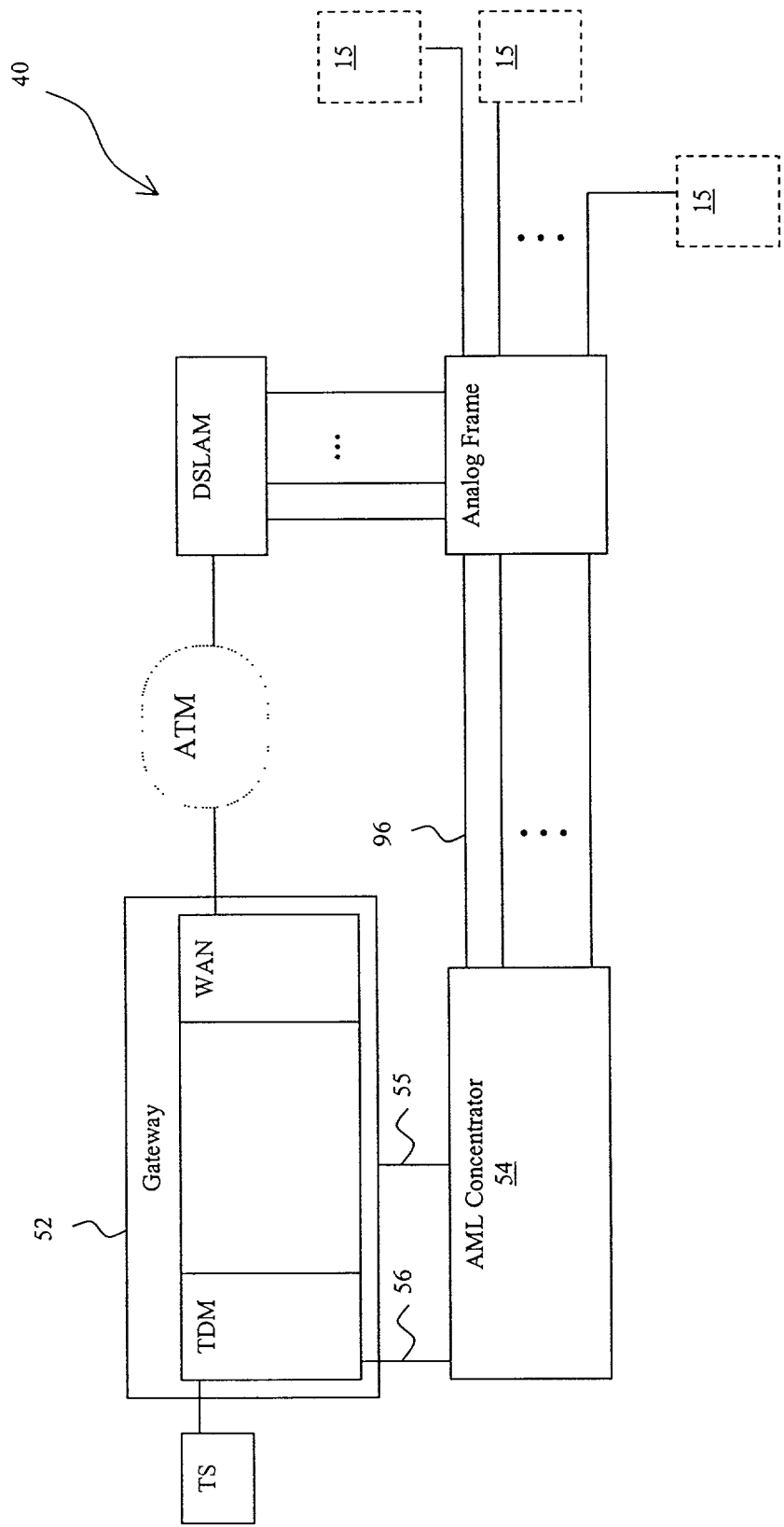
FIG. 2 presents a block diagram of an alternative embodiment featuring an AML concentrator located external from a gateway.

FIG. 2 depicts an alternative embodiment of a system 40 for reliably communicating content for multiple subscriber lines of a customer location via a single physical transmission medium. System 40 includes an AML concentrator 54 that resides outside of a gateway 52. For example, gateway 52 may reside in one chassis, and AML concentrator 54 may reside in a separate chassis or channel bank. In system 40, the voice calls are routed to AML Concentrator 54 over an external TDM path 56, such as an E1 line or a T1 line. Gateway 52 also communicates the control information with AML concentrator 54 via a control path 55. On the other hand, for system 10, where AML concentrator 24 resides within gateway 12, a TDM bus, such as H.110, may be used to transfer the telecommunication information to AML Concentrator 24. In alternative embodiment, higher rate interfaces are used.

Figure 3:
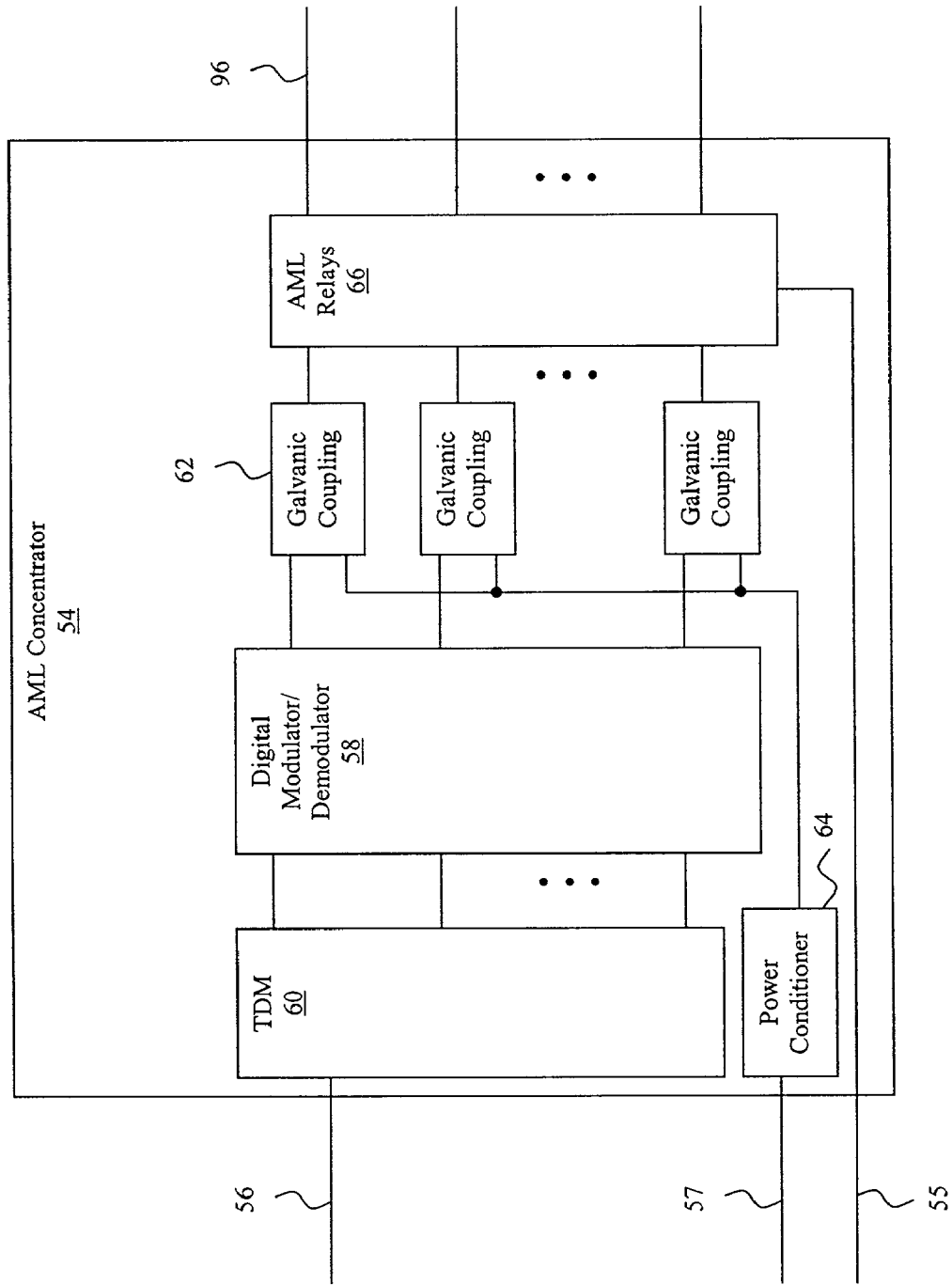
FIG. 3 presents a block diagram of an example AML concentrator.

FIG. 3 depicts AML concentrator 54 in greater detail. Gateway 52 communicates PCM signals to and from AML concentrator 24 via TDM path 56. AML concentrator 54 includes a TDM interface 60 and a digital modulator/demodulator 58. Digital modulator/demodulator 58 converts PCM signals from TDM interface 60 into modulated signals for transmission over local loops. Specifically, in the example embodiment, each customer location 15 uses two or more subscriber lines, and digital modulator/demodulator 58 generates one modulated signal for each customer location 15. Each modulated signal encodes the content for the two or more subscriber lines of an individual customer location 15. Digital modulator/demodulator 58 also demodulates modulated signals received from customer locations 15, extracting content from multiple subscriber lines into PCM signals.

For example, digital modulator/demodulator 58 may use a number of ISDN 2B1Q transceivers which merge telecommunication information from two subscriber lines into one modulated signal using pulse-amplitude modulation (PAM). In alternative embodiments, the digital modulator/demodulator merges more than two subscriber lines into one modulated signal. Voice compression techniques may also be applied to increase the number of phone lines carried on the modulated signal.

In the example embodiment, the 2B1Q modulators select PCM formatted information from TDM interface 60 based on call setup information. On call setup, a particular subscriber's PCM formatted information will be assigned a time slot on TDM interface 60. The 2B1Q modulator will access this information from the assigned time slot. Ringing information is provided in the form of signaling information associated with the time slot as well. Examples of protocols that signal ringing information are GR-303, and TR-008.

AML concentrator 54 also includes coupling circuits 62 that connect ports of digital modulator/demodulator 58 to lifeline paths 96. A power conditioner 64 also injects DC power into the modulated signals to provide power for equipment at customer locations 15. In the example embodiment, that DC power (e.g., −48 volts) is obtained from a line 57 from a central office (CO) of telecommunication network 8. In alternative embodiments, power conditioner 64 uses an AC-to-DC converter, a DC-to-DC converter, or other means for producing power suitable for injection into the modulated signals to drive devices such as IAD 17 and customer premises equipment 16. The modulated signals with line power are also known as AML signals.

In addition, AML concentrator 54 includes a bank of AML relays 66 which selectively connect and disconnect individual lifeline paths 96 to and from the rest of AML concentrator 54. As described in greater detail below, when gateway 52 is communicating with a particular IAD in the normal mode operation, the relay for the corresponding lifeline path 96 is held open to produce a high impedance and keep the modulated signals from reaching the local loop for that IAD. However, when communicating over a local loop in the backup mode of operation, the corresponding relay switches the appropriate lifeline path 96 to low impedance, thereby enabling AML concentrator 54 to send and receive modulated signals over that local loop. In FIG. 2, the control information to operate AML relays 66 is communicated between gateway 52 and AML concentrator 54 via control path 55. Referring again to FIG. 1, the details of AML concentrator 24 are similar to those of AML concentrator 54, but the relays of AML concentrator 24 are controlled directly from the backplane of gateway 12.

AML concentrator 24 thus generates one or more modulated signals, each of which provide an alternate set of multiple subscriber lines. Furthermore, AML concentrator 24 provides the line power that is needed at customer locations 14 to power IADs and provide backup analog service for the multiple subscriber lines in the case of local power loss at customer locations 14. For example, for communications with customer location 14A in backup mode, the AML signal includes enough power to remotely power IAD 17 to demodulate and modulate the AML signal and also power any phones or other customer premises equipment 16 attached to IAD 17. Local power at a customer location is also known as external power, to be distinguished from the power provided by the AML signal. The power provided by the AML signal may also be referred to as line power.

Also included in system 10 is an analog frame 28. In the normal mode, analog frame 28 passes data packets between DSLAM 26 and IADs such as IAD 17. In the backup mode, analog frame 28 passes modulated signals between AML concentrator 24 and IADs such as IAD 17.

Figure 4:
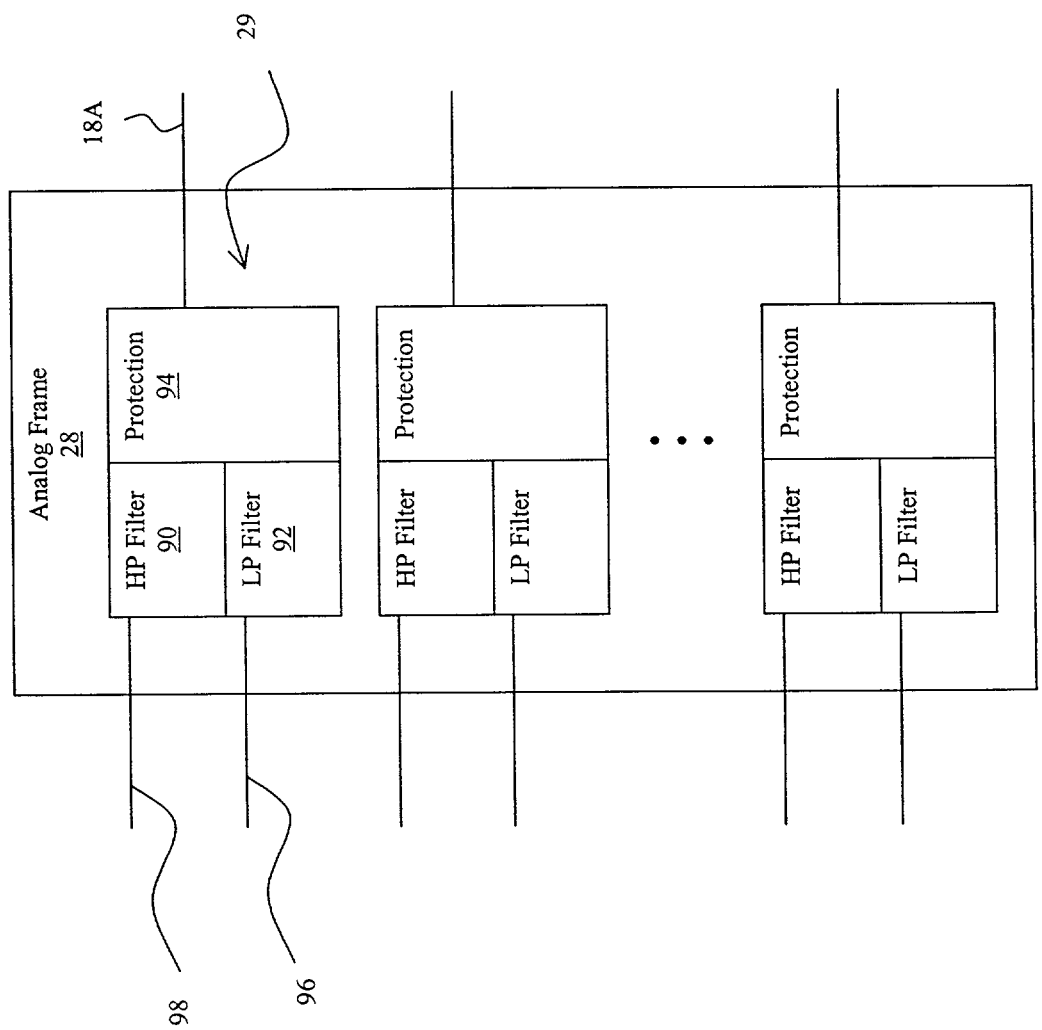
FIG. 4 presents a block diagram of an example analog frame.

With reference to FIG. 4, analog frame 28 includes a signal splitter 29 for each local loop 18. In this embodiment, DSLAM 26 has one DSL interface for each customer location. DSLAM 26 associates a unique packet address with each DSL. DSLAM 26 then routes packets to the DSL, and ultimately to the subscriber, based on the packet address. In this manner, DSLAM 26 routes packets to the appropriate signal splitter.

In the example embodiment, each signal splitter 29 includes a high-pass filter 90, a low-pass filter 92, and a protection circuit 94. Protection circuits 94 provide voltage protection in case of events such as lightning strikes or AC line cross incidents. Each low-pass filter 92 connects and communicates modulated signals between a lifeline path 96 and a corresponding local loop, such as local loop 18A. Each high-pass filter connects and communicates data packets between a packet path 98 and a corresponding local loop, such as local loop 18A. In the example embodiment, each low-pass filter 92 only passes signals in the spectrum from 1–50 kHz, thereby supporting ISDN-based digital added main lines (DAMLs). In the example embodiment, each high-pass filter 90 only passes signals in the spectrum from 60 kHz to 1104 kHz. Alternative embodiments support other DAML modulations, such as ADSL over ISDN and VDSL. Those embodiments use low-pass filters that pass a broader spectrum of frequencies to provide even more bandwidth for AMLs.

In a preferred embodiment, each splitter in the analog frame is simply a junction connecting a line for the AML signal, a line for the DSL signal, and a local loop. In that embodiment, the relays in the AML concentrator operate as described above, and the high-pass filters are implemented at the DSLAM. An alternative embodiment uses only splitters such as splitter 29 and omits the relays.

Figure 5:
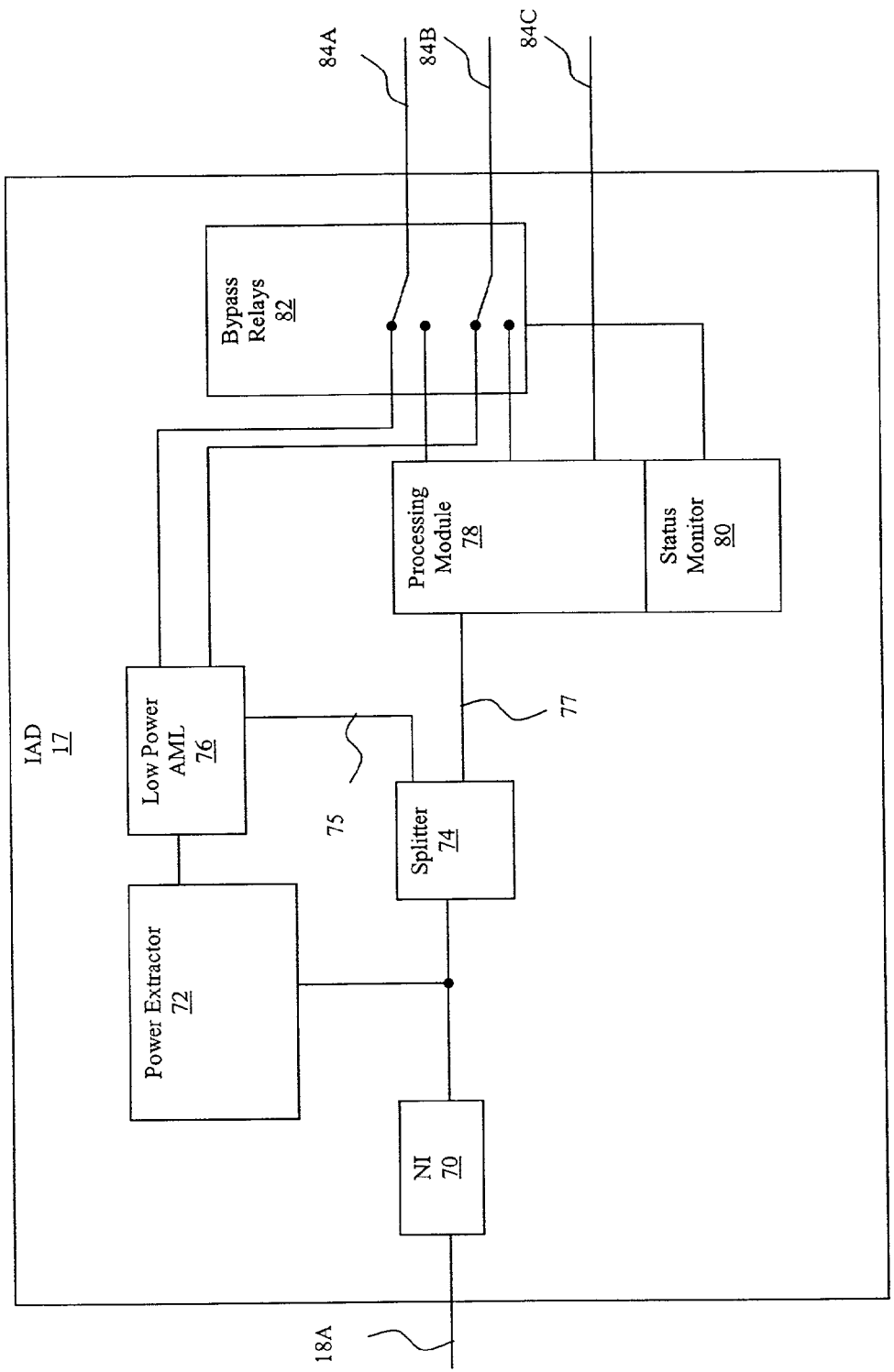
FIG. 5 presents a block diagram of an example IAD.

FIG. 5 depicts IAD 17 in greater detail. IAD 17 receives the AML signal and/or the data packets from local loop 18A through a network interface 70. The data packets may also be referred to as a DSL signal. A power extractor 72 connects across the twisted pair, and converts the line power to more usable levels for analog and digital circuitry within IAD 17. IAD 17 also contains a signal splitter 74 that routes the AML signal to an AML modulator/demodulator 76 via an AML path 75 and routes the DSL signal to a processing module 78 via a DSL path 77.

Splitter 74 performs the same functions as the high pass and low pass filters in analog frame 28. Splitter 74 is generally implemented as a frequency divisions split between the two signals. IAD 17 normally provides phone service for multiple subscriber lines by converting data packets received from DSLAM 26. However, in the case of a local power failure, failure of network equipment such as DSLAM 26, or any other interruption of the data packet service, IAD 17 will cut over to backup mode to provide lifeline service for multiple subscriber lines. In normal mode, processing module 78 converts telecommunication information between analog signal format and data packet format. In backup mode, AML modulator/demodulator 76 converts telecommunication information between analog signal format and AML signal format. In normal mode, processing module 78 operates to provide full IAD functionality. In backup mode, AML modulator/demodulator 76 may use the line power to provide partial IAD functionality, for example in the case of local power failure when line power is not sufficient to operate a full-function IAD.

For instance, in the illustrated embodiment, in the normal mode of operation processing module 78 uses a certain amount of local power to extract content for three subscriber lines 84A, 84B, and 84C from the DSL signal. In the case of local power failure, however, backup mode is initiated, in which AML modulator/demodulator 76 uses less power, specifically the power from the AML signal, and provides more limited services, providing plain old telephone service (POTS) for subscriber lines 84A and 84B only.

IAD 17 also includes a bank of bypass relays 82 and a status monitor 80. If there is an interruption or failure of data packet service, for example due to a power failure at customer location 18A, status monitor 80 responds by terminating normal mode and activating backup mode. In backup mode, status monitor 80 causes bypass relays 82 to connect subscriber lines 84A and 84B to AML modulator/demodulator 76 instead of processing module 78. Subscriber lines 84A and 84B may be connected to phone 16A and personal computer 16B, for example. Accordingly, IAD 17 provides POTS for independent subscriber lines for phone 16A and personal computer 16B, despite failure of data packet service.

In an alternative embodiment, the processing module and the AML modulator/demodulator share POTS codec filter devices that convert PCM data into analog POTS signals. Accordingly, the relays switch the codec filter input and output between the processing module and the AML modulator/demodulator.

In the example embodiment, gateway 12 only sends the DSL signal in normal mode, and IAD 17 and/or AML concentrator 24 notify processing core 22 of failure conditions such as failure of local power at the IAD, to alert gateway 12 of the failure. Gateway 12 responds by directing subsequent voice traffic from telecommunication switch 20 to AML concentrator 24, rather than WAN interface 34, to provide backup service.

Figure 6:
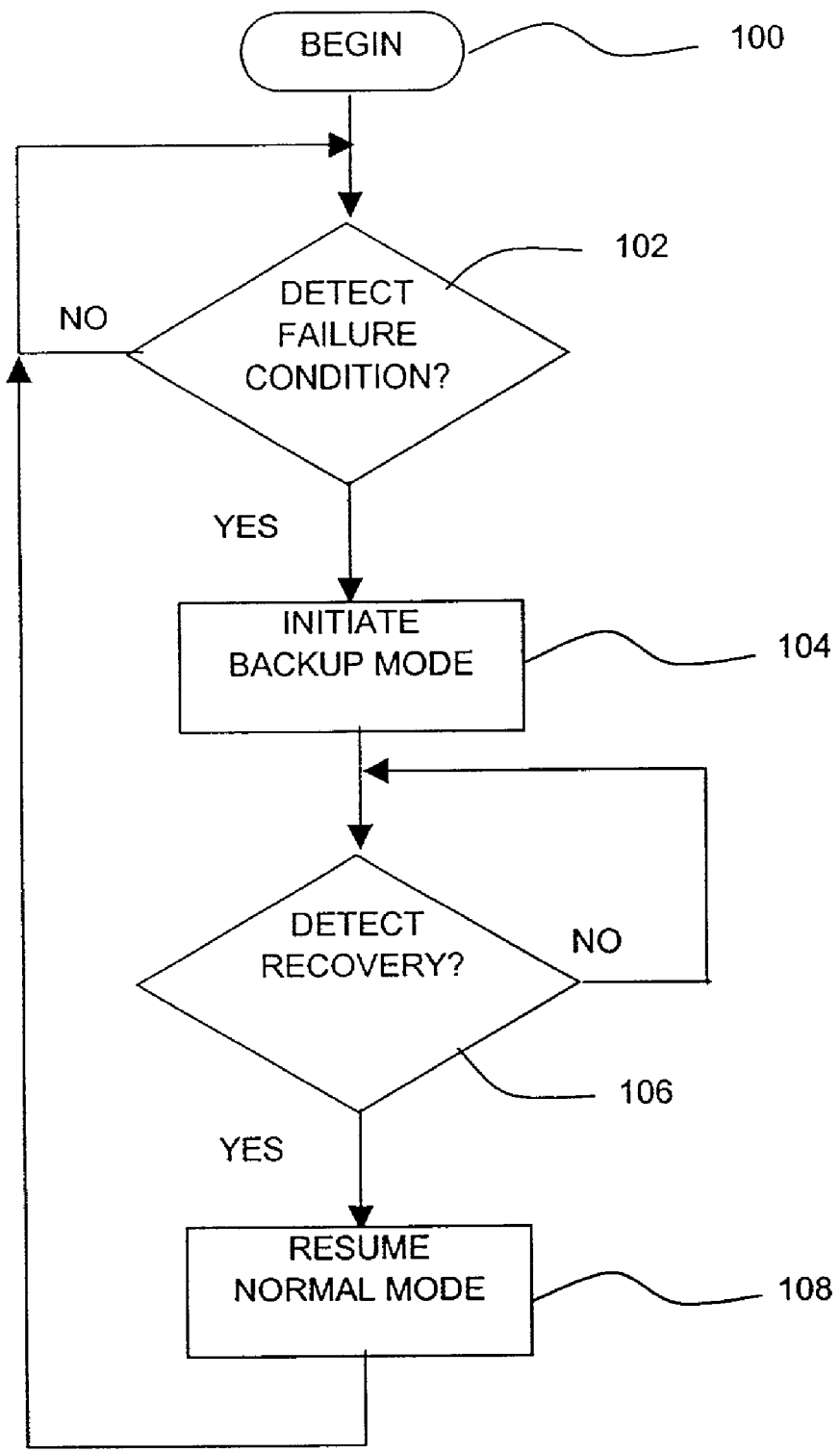
FIGS. 6 and 7 present flowcharts of example processes for reliably communicating content for multiple subscriber lines of a customer location via a single physical transmission medium.

FIG. 6 depicts an example process for reliably communicating content for multiple subscriber lines via a single physical transmission medium between a telecommunication gateway and equipment at a customer location. The illustrated process begins at block 100 with individuals at customer location 14A using multiple subscriber lines to communicate with telecommunication network 8 via gateway 12. Specifically, at the beginning of the illustrated process, gateway 12 and IAD 17 are operating in normal mode, with data packets being used to communicate the content for the multiple subscriber lines between IAD 17 and gateway 12 via DSLAM 26.

As indicated at block 102, gateway 12 then determines whether data packet service has failed. For example, gateway 12 may determine that data packet service has failed in response to detecting an extended loss of frame on the DSL signal or experiencing inability to maintain a virtual circuit between gateway 12 and IAD 17. If data packet service has not failed, gateway 12 continues to communicate with IAD 17 using the normal mode, as indicated by the arrow returning to block 102.

However, if data packet service has failed, processing core 22 terminates normal mode and initiates backup mode, thereby switching service to the AML signal, as shown at block 104. Specifically, in the example embodiment, processing core 22 causes AML relays 66 to close the circuit with the appropriate lifeline path 96, and processing core 22 discontinues transmission of data packets for IAD 17. Consequently, communications between telecommunication network 8 and IAD 17 transit system 10 via AML concentrator 24 and lifelines 96.

As depicted at block 106, gateway 12 then determines whether the failure condition has been cured, for example by attempting to establish a virtual circuit between gateway 12 and IAD 17. If the failure condition has not been cured, system 10 continues to use backup mode for communications with IAD 17, as indicated by the arrow returning to block 106.

However, as indicated at block 108, if the failure condition has been cured, gateway 12 switches back to normal mode, for example by using AML relays 66 to disconnect lifelines 96 and resuming transmission and reception of data packets with telecommunication content for customer location 14A via WAN interface 34. Gateway 12 then continues to use data packets to communicate with IAD 17 and monitors for failure of packet service, as indicated by the arrow returning to block 102.

Figure 7:
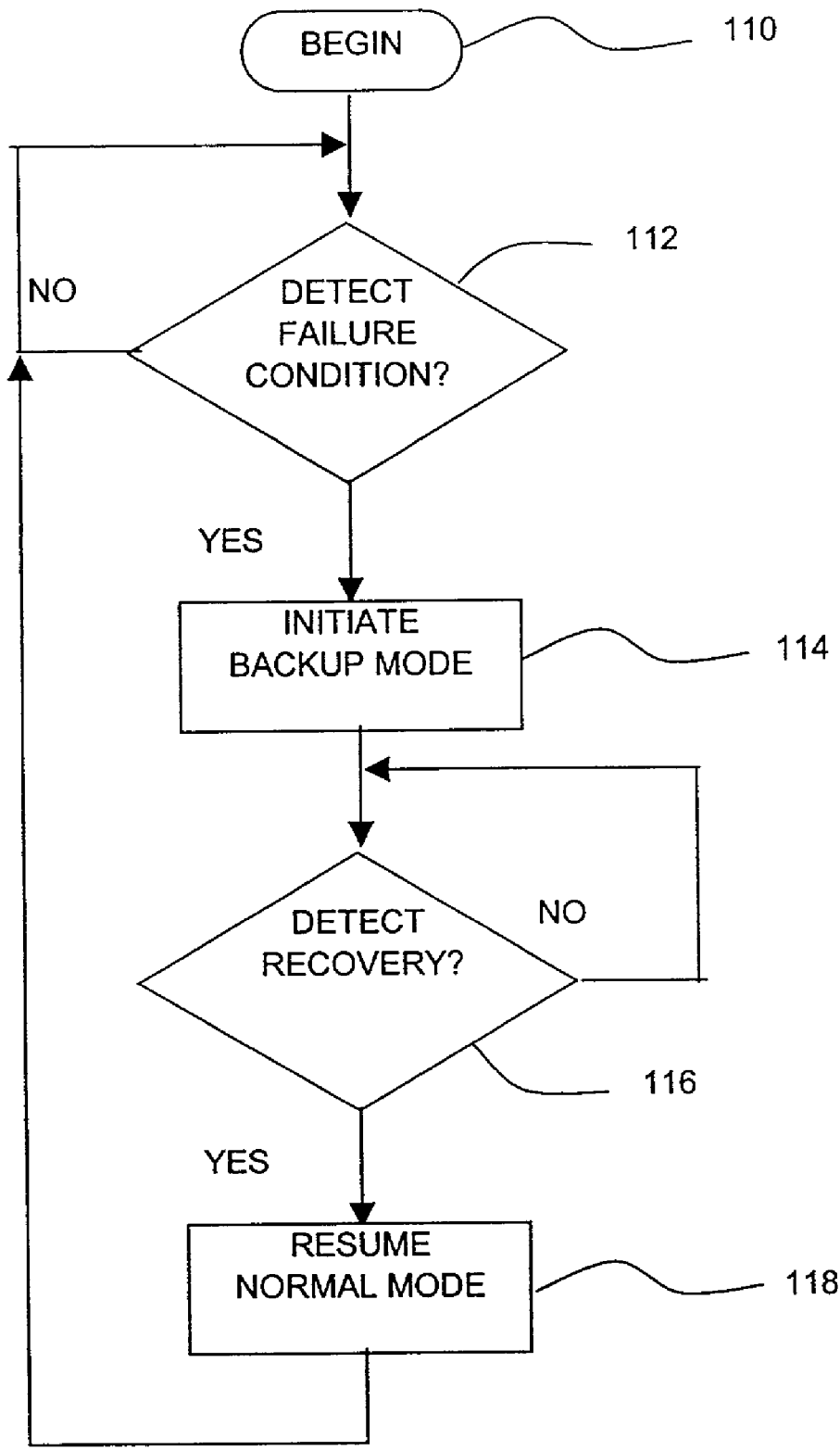

FIG. 7 depicts an example process for reliably communicating content for multiple subscriber lines via a single physical transmission medium from the perspective of IADs such as IAD 17. That process begins at block 110 with individuals at customer location 14A using multiple subscriber lines to communicate with telecommunication network 8 via gateway 12. Specifically, at the beginning of the illustrated process, gateway 12 and IAD 17 are operating in normal mode, with data packets being used to communicate the content for the multiple subscriber lines between IAD 17 and gateway 12 via DSLAM 26.

As indicated at block 112, status monitor 80 then determines whether data packet service is still available. For example, status monitor 80 may determine that data packet service has failed or is no longer available in response a power failure at customer location 14A, in response to detecting an extended loss of frame on the DSL signal, or in response to experiencing inability to maintain a virtual circuit with gateway 12. If data packet service is still available, IAD 17 continues to communicate with gateway 12 using the normal mode, as indicated by the arrow returning to block 112.

Otherwise, IAD 17 activates or initiates backup mode, as shown at block 114. Specifically, in the example embodiment, status monitor 80 causes bypass relays 82 to switch subscriber lines 84A and 84B from processing module 78 to AML modulator/demodulator 76. Consequently, IAD 17 uses AML signals for communications with gateway.

As depicted at block 116, status monitor 80 then determines whether the failure condition has been cured, for example by attempting to establish a virtual circuit between gateway 12 and IAD 17 or by detecting power available at customer location 14A. If the failure condition has not been cured, IAD 17 continues to use backup mode for communications with system 10, as indicated by the arrow returning to block 116.

However, as shown at block 118, if the failure condition has been cured, IAD 17 switches back to normal mode, for example by using bypass relays 82 to reconnect subscriber lines 84A and 84B to respective ports of processing module 78. IAD 17 then resumes transmission and reception of data packets with telecommunication content for customer location 14A. IAD 17 then continues to use data packets to communicate with gateway 12 and monitors for subsequent failure of packet service, as indicated by the arrow returning to block 112.

In conclusion, the present invention provides lifeline service for added main lines. Although the present invention has been described with reference to one or more example embodiments, myriad modifications may be made to the described embodiments without departing from the scope and spirit of this invention. For example, in one alternative embodiment, bypass relays 82 bridge two or more subscriber lines in backup mode in a manner similar to that described in the 0138 application, so that, in backup mode, a first subscriber line at a customer location maintains its independent operation, while second and third subscriber lines operate as a single party line. In other embodiments, the system includes different hardware, software, or combinations of hardware and software for providing the functionality described and illustrated herein. The invention is therefore not limited to the particular embodiments described herein but is instead defined by the following claims.

What is claimed is:

1. A method for reliably communicating content for multiple subscriber lines via a single physical transmission medium between a telecommunication gateway and equipment at a customer location, the method comprising:
   receiving content for first and second subscriber lines of the customer location;
   converting the content for the first and second subscriber lines into packetized data and communicating the packetized data between the customer location and the telecommunication gateway via the single physical transmission medium in a primary mode of operation, such that external power can be used at the customer location to extract the content for the first and second subscriber lines from the packetized data in the primary mode of operation; and
   multiplexing the content for the first and second subscriber lines to form an added-main-line (AML) signal that includes power and communicating the AML signal between the customer location and the telecommunication gateway via the single physical transmission medium in a backup mode of operation, such that the power from the AML signal can be used at the customer location to extract the content for the first and second subscriber lines from the AML signal in the backup mode of operation.

2. The method of claim 1, wherein:
   communicating the packetized data via the single physical transmission medium comprises communicating the packetized data via a local loop; and
   communicating the AML signal via the physical transmission medium comprises communicating the AML signal via the local loop.

3. The method of claim 1, further comprising:
   detecting an error relating to processing the packetized data; and
   in response to detection of the error:
      suspending use of the packetized data; and
      initiating use of the AML signal.

4. The method of claim 3, wherein detecting an error relating to processing the packetized data comprises detecting loss of external power at the customer location.

5. The method of claim 3, wherein detecting an error relating to processing the packetized data comprises detecting failure of a virtual circuit between the customer location and the telecommunication gateway.

6. The method of claim 1, wherein multiplexing the content to form an AML signal comprises generating a modulated signal encoding the content.

7. The method of claim 6, wherein multiplexing the content to form an AML signal comprises generating a pulse-amplitude modulated signal encoding the content.

8. The method of claim 7, wherein generating a modulated signal comprises using three or more discrete voltage levels within the modulated signal to represent three or more respective values.

9. The method of claim 8, wherein generating a modulated signal comprises generating a two-binary one-quaternary (2B1Q) signal encoding the content.

10. The method of claim 1, wherein generating packetized data comprises generating Asynchronous Transfer Mode (ATM) cells.

11. A system for reliably communicating content for multiple subscriber lines of a customer location via a single physical transmission medium, the system comprising:
   a telecommunication interface that receives content for first and second subscriber lines of the customer location;
   a processing core, in communication with the telecommunication interface, that converts the content for the first and second subscriber lines into packetized data for network communications;
   an added-main-line (AML) concentrator, in communication with the telecommunication interface, that multiplexes the content for the first and second subscriber lines to form an AML signal that includes power; and
   a signal splitter, in communication with the processing core, the AML concentrator, and the single physical transmission medium, the signal splitter operable to communicate the packetized data between the processing core and the customer location via the single physical transmission medium in a primary mode of operation and to communicate the AML signal between the AML concentrator and the customer location via the single physical transmission medium in a backup mode of operation, such that external power can be used at the customer location to extract the content for the first and second subscriber lines from the packetized data in the primary mode of operation, and the power from the AML signal can be used at the customer location to extract the content for the first and second subscriber lines from the AML signal in the backup mode of operation.

12. The system of claim 11, wherein the single physical transmission medium comprises a local loop.

13. The system of claim 11, further comprising:
a data packet service module in the processing core;
a network interface in communication with the data packet service module; and
a digital subscriber line access multiplexer (DSLAM) in communication with the network interface; wherein:
the signal splitter communicates with the processing core via the DSLAM and the network interface.

14. The system of claim 11, further comprising an analog frame that includes the signal splitter.

15. The system of claim 11, wherein:
the content is pulse-code modulated and time-division multiplexed;
the processing core converts the time-division multiplexed content into packetized data; and
the AML concentrator converts the time-division multiplexed content into an AML signal.

16. The system of claim 11, wherein the processing core suspends use of the packetized data and initiates use of the AML signal in response to an error relating to processing the packetized data.

17. The system of claim 16, wherein the processing core suspends use of the packetized data and initiates use of the AML signal in response to loss of external power at the customer location.

18. The system of claim 16, wherein the processing core suspends use of the packetized data and initiates use of the AML signal in response to failure of a virtual circuit to the customer location.

19. The system of claim 11, wherein the AML concentrator converts the time-division multiplexed content into a pulse-amplitude modulated signal.

20. The system of claim 11, wherein the AML concentrator uses three or more discrete voltage levels within the AML signal to represent three or more respective values.

21. The system of claim 20, wherein the AML concentrator comprises a two-binary one-quaternary (2B1Q) transceiver that converts the content into a 2B1Q signal.

22. The system of claim 11, wherein the processing core encodes the content for the first and second subscriber lines using Asynchronous Transfer Mode (ATM) cells.

23. The system of claim 11, further comprising an IAD that:
receives the packetized data and uses local power to extract the content for the first and second subscriber lines from the packetized data in a first mode of operation; and
receiving the AML signal and uses the line power to extract the content for the first and second subscriber lines from the AML signal in a second mode of operation.

* * * * *